United States Patent [19]
Pfister et al.

[11] 3,835,157
[45] Sept. 10, 1974

[54] HETEROCYCLIC SUBSTITUTED XANTHONE CARBOXYLIC ACID COMPOUNDS

[75] Inventors: Jurg R. Pfister, Los Altos; Ian T. Harrison; John H. Fried, both of Palo Alto, all of Calif.

[73] Assignee: Syntex (U.S.A.) Inc., Palo Alto, Calif.

[22] Filed: May 17, 1972

[21] Appl. No.: 254,232

[52] U.S. Cl. 260/332.2 A, 260/327 TH, 260/332.1, 260/335, 424/275, 424/283, 260/473 R, 260/475 R
[51] Int. Cl.............................................. A61k 27/00
[58] Field of Search ...... 260/332.2 A, 327 TH, 335, 260/332.1

[56] References Cited
UNITED STATES PATENTS
3,518,272 6/1970 Strandtmann et al. ............ 260/286
3,706,768 12/1972 Bays.................................. 260/335

*Primary Examiner*—John D. Randolph
*Assistant Examiner*—C. M. S. Jaisle
*Attorney, Agent, or Firm*—Walter H. Dreger; Gerard A. Blaufarb; William B. Walker

[57] ABSTRACT

Compounds containing and methods employing, as the essential ingredient, heterocyclic substituted xanthone carboxylic acid compounds which are useful in the treatment of allergic conditions. Methods for preparing these compounds and compositions and intermediates therein are also disclosed. 7-(3-Tetrahydrofuryl)-xanthone-2-carboxylic acid is illustrated as representative of the class.

17 Claims, No Drawings

HETEROCYCLIC SUBSTITUTED XANTHONE CARBOXYLIC ACID COMPOUNDS

The present invention is directed to novel heterocyclic substituted xanthone carboxylic acid compounds and to compositions containing and methods utilizing these compounds as the essential ingredient in the treatment of symptoms associated with allergic manifestations, for example, asthmatic conditions.

In a first aspect, the present invention relates to heterocyclic substituted xanthone carboxylic acid compounds selected from those represented by the following formulas:

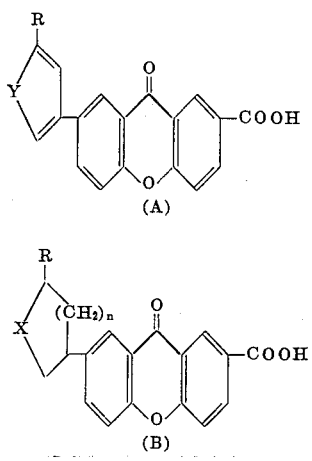

and the pharmaceutically acceptable, non-toxic esters, amides and salts thereof, wherein each R is hydrogen or lower alkyl; X is oxy, thio, sulfinyl, or sulfonyl; n is 1 or 2; and Y is oxy or thio.

Thus included within the scope of the present invention are the C-7 substituted xanthone-2-carboxylic acid compounds and the pharmaceutically acceptable, non-toxic esters, amides, and salts thereof, wherein the substituent is selected from 3-furyl and 3-thienyl of Formula (A) above, and from 3-tetrahydrofuryl, 3-tetrahydrothienyl, 1-oxo-3-tetrahydrothienyl, 1,1-dioxo-3-tetrahydrothienyl, 3-tetrahydropyranyl, 3-tetrahydrothiopyranyl, 1-oxo-3-tetrahydrothiopyranyl, and 1,1-dioxo-3-tetrahydrothiopyranyl of Formula (B) above, and the lower alkyl (R) substituted derivatives thereof.

In a second aspect, the present invention is directed to a method useful for relieving symptoms associated with allergic manifestations, such as are brought about by antigen-antibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g., histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

This aspect of the present invention thus relates to a method useful for inhibiting the effects of the allergic reaction which comprises administering an effective amount of a compound selected from those represented above (A and B) and the pharmaceutically acceptable non-toxic esters, amides, and salts thereof; or a pharmaceutically acceptable non-toxic composition incorporating said acids, esters, amides or salts as an essential ingredient.

The present invention, in a third aspect, is directed to pharmaceutical compositions useful for inhibiting the effects of the allergic reaction comprising an effective amount of a compound selected from those represented above (A and B) and the pharmaceutically acceptable non-toxic esters, amides and salts thereof; in admixture with a pharmaceutically acceptable non-toxic carrier.

The compounds of the present invention are also smooth muscle relaxants, e.g., bronchial dilators, and are therefore useful in the treatment of conditions in which such agents may be indicated, as for instance, in the treatment of broncho-constriction. The compounds of the present invention are also vasodilators and are therefore useful in the treatment of conditions in which such agents may be indicated, as for instance, in renal and cardiac disorders.

In the practice of the method of the present invention, an effective amount of a compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered topically, parenterally, by inhalation, and preferably orally, in the form of either solid, liquid, or gaseous dosages including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or, perhaps, imminent; however, the method hereof is also usefully practiced as continuous or prophylactic treatment.

In view of the foregoing as well as in consideration of the degree or severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7,000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and blycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., *Immunology*, 16, 749 (1969).

The compounds of the present invention can be prepared in accordance with the following reaction sequence:

Sequence A

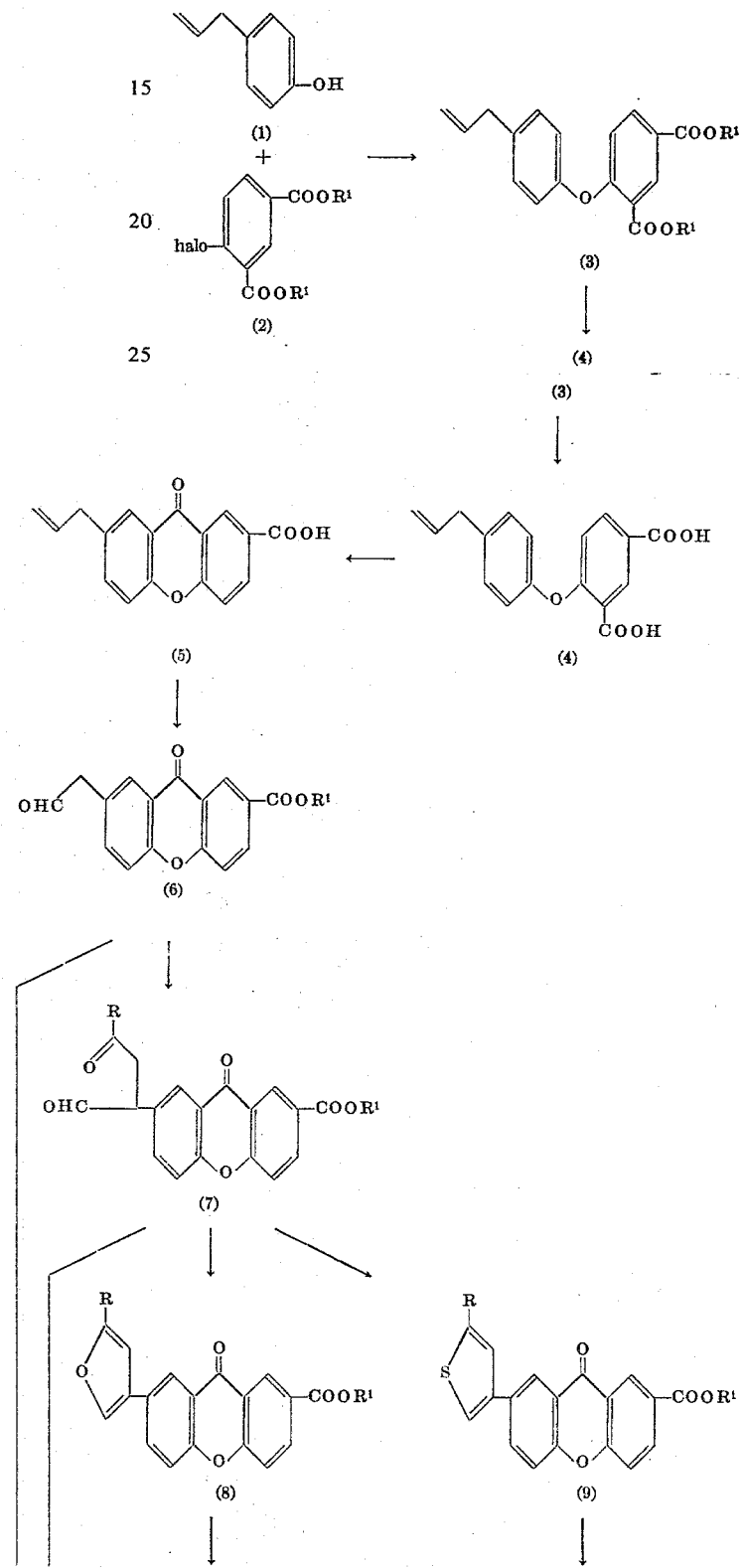

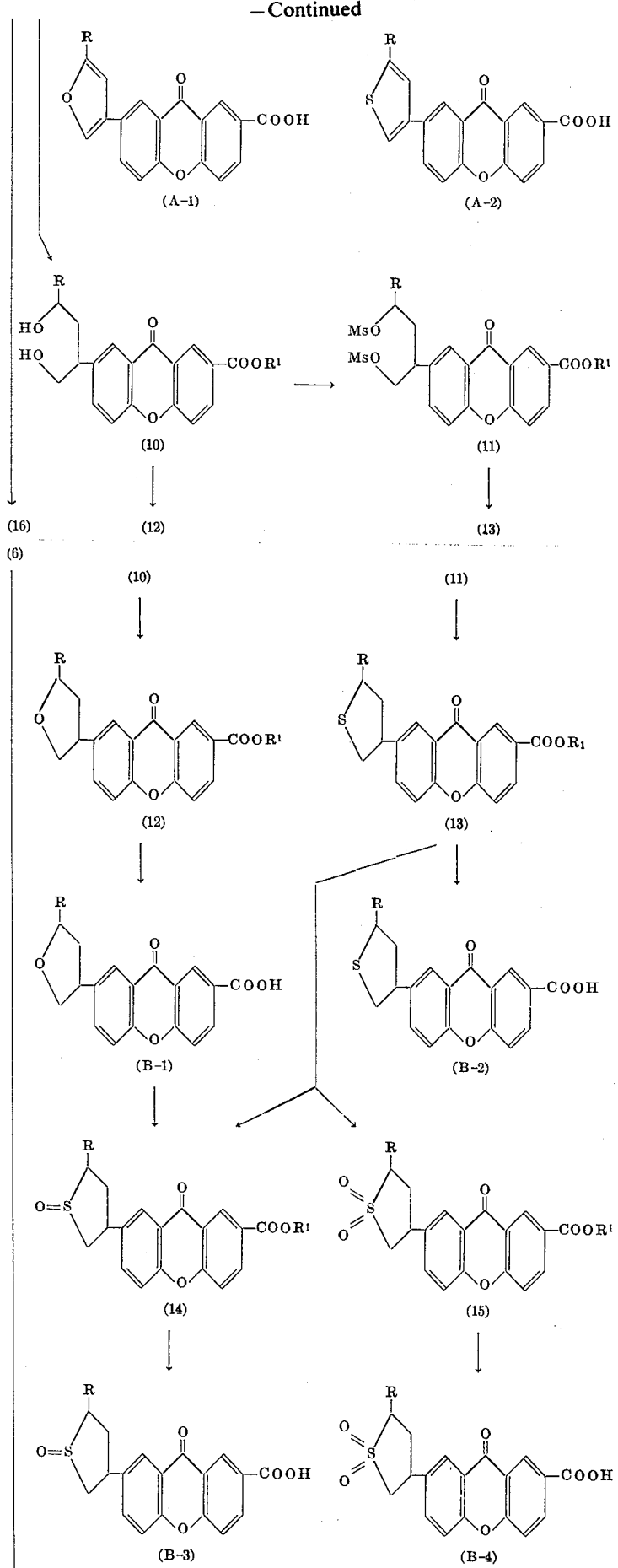

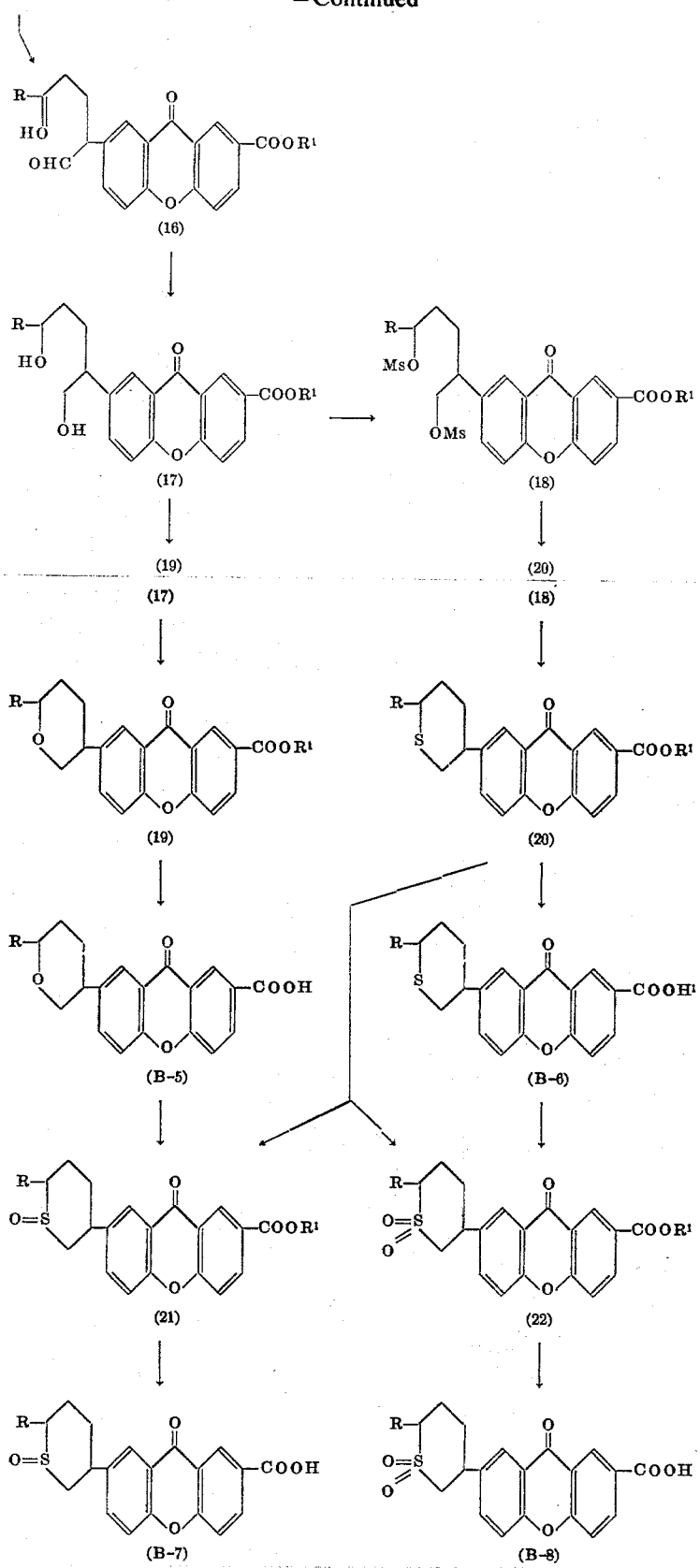
wherein each R is as above defined, $R^1$ is lower alkyl, preferably methyl, halo is bromo, chloro, fluoro, or iodo, preferably bromo, and Ms is mesyl (methylsulfonyl).
With reference to the above reaction sequence, p-allylphenol (1) is condensed with the 1,3-dicarbo(lower)-alkoxy-4-halobenzene compound (2) in the presence of cuprous oxide optionally in organic liquid reaction medium, preferably an organic amide, such as dimethyl acetamide, dimethylformamide, N-methyl pyrrolidone, tetramethylurea, and so forth, to prepare the corresponding 1,3-dicarbo(lower)alkoxy-4-(p-allyl phenyloxy)-benzene compound (3).

The reaction is preferably conducted in an inert organic reaction medium, such as those listed above, or suitable mixtures of one or more of such media. The reaction is further conducted at temperatures ranging from about 80° to about 220°C, preferably from about 120° to about 200°C, and for a period of time sufficient to complete the reaction, ranging from about 2 hours to about 25 hours.

The reaction consumes the reactants on the basis of one mole of the substituted phenol per mole of the dicarbo(lower)carboxyhalobenzene per half mole of cuprous oxide. However, the amounts of the reactants to be employed are not critical, some of the desired compound (3) product being obtained when employing any proportions thereof. In the preferred embodiments, the reaction is conducted by reacting from about one to about three moles of the substituted phenol compound with about 1 to about 1.2 moles of the dicarbo(lower)-carboxyhalobenzene compound in the presence of from about 0.5 to about 0.6 moles of the cuprous oxide. The inert organic reaction medium, if employed, is used in solvent amounts.

Thereafter, the prepared compound (3) is base hydrolyzed to give the corresponding 1,3-dicarboxy-4-(p-allyl-phenyloxy)-benzene (4). The base hydrolysis conditions can be any employed conventionally in the art. Generally, the hydrolysis reaction is conducted using an alkali metal hydroxide at about 50° to about 90°C and for a period of time sufficient to complete the reaction, ranging from about 15 minutes to about 60 minutes, preferably in the presence of inert organic reaction media, such as those normally employed in organic chemical reactions of this type, e.g., aqueous alkanol solutions. Although two moles of base are required per mole of compound (3), the amounts employed are not critical to produce the desired hydrolysis. Preferably from about three to about five moles of base are employed per mole of compound (3) and the reaction medium, if employed, is used in solvent amounts.

The thus prepared diacid compound (4) is then cyclized with phosphoryl chloride, thionyl chloride, sulfuric acid, hydrogen fluoride, or preferably, polyphosphoric acid (PPA), to give the corresponding 7-allylxanthone-2-carboxylic acid compound (5). The reaction is preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180°C, and for a period of time sufficient to complete the reaction ranging from about 15 minutes to about 90 minutes.

Although the reaction consumes the reactants on the basis of one mole of compound (4) per mole of cyclizing reagent, the reaction can be performed using any proportions of reactants. In the preferred embodiments, however, the reaction is conducted using from about 20 to about 50 moles of the cyclizing reagent per mole of starting compound (4).

The thus prepared 7-allylxanthone-2-carboxylic acid (5) is then esterified by treatment with lower alkyl halide and lithium carbonate at room temperature and the ester oxidized by treatment with osmium tetroxide and alkali metal periodate in aqueous organic media, such as aqueous dioxane, to give the corresponding 7-(oxoethyl)-xanthone-2-carboxylate (6). The reaction is conducted at from about 20° to about 50°C and for a period of time ranging from about five to about 20 hours and using from about 2.0 to about 2.1 moles of alkali metal (11) periodate per mole of compound (5) and aqueous organic medium in solvent amounts.

The oxoethyl compound (6) is then reacted with an α-chloro-aldehyde or -ketone in the presence of alkali metal hydride, e.g., sodium hydride, in organic medium, such as dimethylformamide, to give the 7-(1-formyl-3-oxo-1-alkyl)-xanthone-2-carboxylate (7). The reaction is conductd at from about 10° to about 25°C and for a period of time ranging from about two to about six hours and using from about 1.1 to about 1.3 moles each of α-chloroketone and alkali metal hydride per mole of compound (5) and organic medium in solvent amounts.

The latter compound (7) is then cyclized by treatment with acid, e.g., hydrogen chloride in acetic acid, to give the 3-furyl compound (8) which can be hydrolyzed with base under conventional conditions to give the 7-(3-furyl)-xanthone-2-carboxylic acid products (A-1). The acid cyclization reaction is conducted at from about 60° to about 100°C and for a period of time ranging from about 1 hour to about 5 hours and using excess hydrogen chloride.

The cyclization of (7) can alternatively be conducted with phosphorus pentasulfide in, e.g., benzene or pyridine, under conditions as described above, to give the 3-thienyl compound (9) which can be conventionally base hydrolyzed to give the 7-(3-thienyl)-xanthone-2-carboxylic acid products (A-2).

The compound (7) can alternatively be reduced, such as with sodium borohydride in organic media, such as dimethyl-formamide, to give the 7-(1-hydroxymethyl-3-hydroxy-1-alkyl)-xanthone-2-carboxylate (10). The latter is cyclized by treatment at from about 150° to about 170°C for about 10 to about 25 hours in dimethylsulfoxide, or by treatment with mesyl chloride chloride followed by base treatment, to give the 3-tetrahydrofuryl compound (12) which can be conventionally base hydrolyzed, if necessary, to give the 7-(3-tetrahydrofuryl)-xanthone-2-carboxylic acid products (B-1).

Compounds (10) can alternatively be mesylated by treatment with methylsulfonyl chloride in base, such as triethylamine, to give the dimesyl compound (11). This reaction is conducted at from about 0° to about 20°C and for a period of time ranging from about 2 hours to about 15 hours and using from about 2.1 to about 2.3 moles of methylsulfonyl chloride per mole of compound (10) and the base in excess amounts. The compound (11) is cyclized by treatment with alkali metal sulfide, e.g., sodium sulfide, at from about 0° to about 25°C for about one-half to about 3 hours in organic medium, e.g., dimethylformamide, to give the 3-tetrahydrothienyl compounds (13) which when base hydrolyzed, as described above, give the 7-(3-tetrahydrothienyl)-xanthone-2-carboxylic acid products (B-2).

The 3-tetrahydrothienyl compounds (13) can also be oxidized to give the 1-oxo and 1,1-dioxo compounds (14) and (15) and these base hydrolyzed to the product acids thereof (B-3) and (B-4), respectively. Conducting said oxidation with a peracid, such as peracetic acid, m-chloroperbenzoic acid, p-nitroperbenzoic acid, perphthalic acid, and so forth, give the 1-oxo compounds (14) and conducting said oxidation with excess hydrogen peroxide gives compounds (15).

In said oxidation steps, and particularly that employing peracid, a mixture of products (14) and (15) may be obtained. If obtained, the mixture can be conventionally separated, such as via chromatography, if desired, to isolate the oxidized products.

The oxoethyl compound (6) alternatively can be reacted with 3-oxo-1-alkene and base, such as sodium methoxide, under Michael addition conditions, to give the 7-(1-formyl-4-oxo-1-alkyl)-xanthone-2-carboxylate compounds (16). The latter can be reduced to (17), thence cyclized to (19), and thence hydrolyzed to the 7-(3-tetrahydropyranyl)-xanthone-2-carboxylic acid products (B-5) hereof, all as described above (7 → 10 → 12 → B-1). Similarly, the dihydroxy compound (17) alternatively can be dimesylated to (18), thence cyclized to (20), thence hydrolyzed to (B-6), all as described above (10 → 11 → 13 → B-2), or the compound (20) can be oxidized to (21) and (22) and each hydrolyzed respectively to (B-7) and (B-8), all as described above (13 → 14, 15 → B-3, B-4).

The acid esters of the xanthone-2-carboxylic acids hereof are prepared upon treatment of the acid with ethereal diazoalkane, such as diazomethane and diazoethane, or with the desired lower alkyl iodide in the presence of lithium carbonate at room temperature or with the desired lower alkanol in the presence of a trace of sulfuric acid at reflux. The glycerol esters are prepared by treating the acid with thionyl chloride followed by treatment with a suitably protected ethylene glycol or propylene glycol (e.g., solketal) in pyridine, and hydrolyzing the protecting group of the ester thus formed with dilute acid.

The amides of the xanthone-2-carboxylic acids hereof are prepared by treatment of the acids with thionyl chloride followed by treatment with anhydrous ammonia, alkyl amine, dialkyl amine, dialkylaminoalkylamine, alkoxyalkylamine, or phenethylamine.

The salts of the xanthone-2-carboxylic acids hereof are prepared by treating the corresponding acids with pharmaceutically acceptable base. Representative salts derived from such pharmaceutically acceptable bases are sodium, potassium, lithium, ammonia, calcium, magnesium, ferrous, ferric, zinc, manganous, aluminum, manganic, the salts of trimethylamine, triethylamine, tripropylamine, $\beta$-(dimethylamino)ethanol, triethanolamine, $\beta$-(diethylamino)ethanol, arginine, lysine, histidine, N-ethylpiperidine, hydrabamine, choline, betaine, ethylenediamine, glucosamine, methyl glucamine, theobromine, purines, piperazine, piperidine, polyamine resins, caffeine procaine, or the like. The reaction is conducted in an aqueous solution, alone or in combination with an inert, water miscible organic solvent, at a temperature of from about 0°C to about 100°C, preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids the free acid starting material is treated with about one-half molar equivalent of pharmaceutically acceptable base. When the aluminum salts of the acids are prepared, about one-third molar equivalent of the pharmaceutically acceptable base are employed.

In the preferred embodiment of the present invention, the calcium salts and magnesium salts of the acids are prepared by treating the corresponding sodium or potassium salts of the acids with at least one molar equivalent of calcium chloride or magnesium chloride, respectively, in an aqueous solution, alone or in combination with an inert water miscible organic solvent, at a temperature of from about 20°C to about 100°C.

In the preferred embodiment of the present invention, the aluminum salts of the acids are prepared by treating the acids with at least one molar equivalent of an aluminum alkoxide, such as aluminum triethoxide, aluminum tripropoxide and the like, in a hydrocarbon solvent, such as benzene, xylene, cyclohexane, and the like, at a temperature of from about 20°C to about 115°C.

In the present specification and claims, by the term "lower alkyl" is intended a lower alkyl group containing one to five carbon atoms including straight and branched chain groups, for example, methyl, ethyl, n-propyl, isopropyl, n-butyl, isobutyl, sec-butyl, t-butyl, n-pentyl, isopentyl, sec-pentyl, and t-pentyl.

By the term "pharmaceutically acceptable, non-toxic esters, amides, and salts" is respectively intended an alkyl or glycerol ester; an unsubstituted, monoalkyl, dialkyl, dialkylaminoalkyl, alkoxyalkyl, or phenethyl substituted amide and a salt as defined above.

The starting compounds for use in the present invention are known and can be prepared by known methods. For example, p-allylphenol is prepared by allylation of phenol with allyl chloride in the presence of cuprous chloride and the 1,3-dicarbalkoxy-4-halobenzene starting compounds are conveniently prepared by oxidizing 1,3-dimethyl-4-halobenzene (4-halo-m-xylene) with potassium permanganate in aqueous t-butanol followed by conventional esterification.

The following examples illustrate the method by which the present invention can be practiced.

EXAMPLE 1

A mixture of 5.2 grams of 1,3-dicarbomethoxy-4-bromobenzene, 3.8 g. of p-allylphenol, 1.5 g. of cuprous oxide and 60 ml. of tetramethylurea is heated to 165°C and maintained thereat with stirring for 18 hours under a nitrogen atmosphere. After this time, the reaction mixture is diluted with water and extracted with ether. The extracts are dried and evaporated to give 1,-3-dicarbomethoxy-4-(p-allylphenyloxy)-benzene.

1,3-Dicarbomethoxy-4-(p-allylphenyloxy)-benzene (2.3 g.) is dissolved in 50 ml. of ethanol and the mixture treated with 15 ml. of 4 percent aqueous potassium hydroxide solution. The reaction mixture is refluxed for 30 minutes, concentrated under reduced pressure, and acidified with dilute hydrochloric acid. The solid collected upon filtration is washed with water and dried to give 1,3-dicarboxy-4-(p-allyl-phenyloxy)-benzene which is recrystallized from ethanol:water.

A solution of 1.6 g. of 1,3-dicarboxy-4-(p-allyl-phenyloxy)-benzene in 30 ml. of concentrated sulfuric acid is warmed to 80°C. The mixture is then allowed to stand at room temperature for 16 hours after which time it is poured into ice water, filtered, washed and dried to give 7-allyl-xanthone-2-carboxylic acid which is recrystallized from tetrahydrofuran:ethanol.

The foregoing method can also be employed using an alternative 1,3-carboloweralkoxy-4-halo starting compound such as 1,3-dicarbomethoxy-4-chloro or iodo benzene, 1,3-dicarboethoxy-4-fluoro benzene, 1,3-dicarboethoxy-4-bromo benzene, and the like, with similar results.

EXAMPLE 2

5.2 Grams of 7-(allyl)-xanthone-2-carboxylic acid is added to 160 ml. of absolute methanol. To the resultant solution are added 8.0 ml. of concentrated sulfuric acid and the mixture is then heated at reflux for about 2 hours. The mixture is then cooled to 40°C and sufficient water is added to bring the total volume to 400 ml. The resultant mixture is then filtered to give methyl 7-(allyl)-xanthone-2-carboxylate.

In like manner, the other lower alkyl esters corresponding to the product compound are prepared.

A solution of 8.25 g. of methyl 7-(allyl)-xanthone-2-carboxylate in 300 ml. of dioxane and 50 ml. of water is stirred for six hours at room temperature with 80 mg. of osmium tetroxide and 9.0 g. of sodium periodate. After this period of time, the mixture is filtered, the filtrate concentrated in vacuo and the product precipitated by the addition of water to give methyl 7-(2-oxoethyl)-xanthone-2-carboxylate.

To a solution of 4.35 g. of methyl 7-(2-oxoethyl)-xanthone-2-carboxylate in 65 ml. of dimethylformamide, 500 mg. of sodium hydride are added and the mixture is stirred for 15 minutes at room temperature. After this period of time, a solution of 1.2 g. of 1-chloro-2-oxo-n-propane in 25 ml. of dimethylformamide is added dropwise. The mixture is stirred at room temperature for 4 hours, poured into dilute hydrochloric acid and extracted with ethyl acetate to give methyl 7-(1-formyl-3-oxo-1-n-butyl)-xanthone-2-carboxylate.

In like manner, by employing the reactants of Column A below in the procedure of the third paragraph hereof, the respective products listed in Column B are prepared.

| Column A | Column B |
| --- | --- |
| 1-chloro-2-oxo-n-butane | methyl 7-(1-formyl-3-oxo-1-n-pentyl)-xanthone-2-carboxylate |
| 1-chloro-2-oxo-n-pentane | methyl 7-(1-formyl-3-oxo-1-n-hexyl)-xanthone-2-carboxylate |
| 1-chloro-2-oxo-3-methyl-n-butane | methyl 7-(1-formyl-3-oxo-4-methyl-n-pentyl)-xanthone-2-carboxylate |
| 1-chloro-2-oxo-n-hexane | methyl 7-(1-formyl-3-oxo-1-n-heptyl)-xanthone-2-carboxylate |
| 1-chloro-2-oxo-4-methyl-n-pentane | methyl 7-(1-formyl-3-oxo-5-methyl-n-hexyl)-xanthone-2-carboxylate |
| 1-chloro-2-oxo-3-methyl-n-pentane | methyl 7-(1-formyl-3-oxo-4-methyl-n-hexyl)-xanthone-2-carboxylate |
| 1-chloro-2-oxo-3,3-dimethyl-n-butane | methyl 7-(1-formyl-3-oxo-4,4-dimethyl-n-pentyl)-xanthone-2-carboxylate |
| 1-chloro-2-oxo-n-heptane | methyl 7-(1-formyl-3-oxo-n-octyl)-xanthone-2-carboxylate |
| 1-chloro-2-oxoethane | methyl 7-(1-formyl-3-oxo-n-propyl)-xanthone-2-carboxylate |

In like manner, the corresponding lower alkyl carboxylates are prepared by employing the corresponding ester starting compound, said ester being prepared as described in Paragraph 1 of this Example.

EXAMPLE 3

2.85 Grams of methyl 7-(1-formyl-3-oxo-1-n-butyl)-xanthone-2-carboxylate and 0.6 g. of p-toluenesulfonic acid are refluxed in 120 ml. of toluene for six hours, water being continuously removed via a Dean-Stark separator. After cooling, the mixture is washed with sodium bicarbonate solution and the solvent removed in vacuo to give methyl 7-(5-methyl-3-furyl)-xanthone-2-carboxylate.

Methyl 7-(5-methyl-3-furyl)-xanthone-2-carboxylate (1.9 g.), 100 ml. of ethanol and 10 ml. of 2N sodium hydroxide is refluxed for 30 minutes, filtered and acidified. The product is isolated by suction filtration, washed neutral (ethanol:water) to give 7-(5-methyl-3-furyl)-xanthone-2-carboxylic acid.

In like manner, the following acid products are prepared, through their respective methyl esters by using the procedures of this Example on the products of Column B of Example 2.

7-(5-ethyl-3-furyl)-xanthone-2-carboxylic acid,
7-(5-n-propyl-3-furyl)-xanthone-2-carboxylic acid,
7-(5-isopropyl-3-furyl)-xanthone-2-carboxylic acid,
7-(5-n-butyl-3-furyl)-xanthone-2-carboxylic acid,
7-(5-isobutyl-3-furyl)-xanthone-2-carboxylic acid,
7-(5-sec-butyl-3-furyl)-xanthone-2-carboxylic acid,
7-(5-t-butyl-3-furyl)-xanthone-2-carboxylic acid,
7-(5-n-pentyl-3-furyl)-xanthone-2-carboxylic acid, and
7-(3-furyl)-xanthone-2-carboxylic acid.

EXAMPLE 4

2.82 Grams of Methyl 7-(1-formyl-3-oxo-1-n-butyl)-xanthone-2-carboxylate and 3.0 g. of phosphorous pentasulfide are stirred in 60 ml. of pyridine for 12 hours at 100°C. Two hundred milliliters of hot benzene are then added and the resulting mixture is filtered hot. After cooling and washing with dilute HCl and water, the solvent is evaporated and the residue filtered through alumina ($CH_2Cl_2$) and recrystallized from $CHCl_3$/EtOH to give methyl 7-(5-methyl-3-thienyl)-xanthone-2-carboxylate.

The thus prepared compound when hydrolyzed according to the procedure of the second paragraph of Example 3, affords 7-(5-methyl-3-thienyl)-xanthone-2-carboxylic acid.

In like manner, the following acid products are prepared, through their respective methyl esters by using the procedures of this Example on the products of Column B of Example 2.

7-(5-ethyl-3-thienyl)-xanthone-2-carboxylic acid,
7-(5-n-propyl-3-thienyl)-xanthone-2-carboxylic acid,
7-(5-isopropyl-3-thienyl)-xanthone-2-carboxylic acid,
7-(5-n-butyl-3-thienyl)-xanthone-2-carboxylic acid,
7-(5-isobutyl-3-thienyl)-xanthone-2-carboxylic acid,
7-(5-sec-butyl-3-thienyl)-xanthone-2-carboxylic acid,
7-(5-t-butyl-3-thienyl)-xanthone-2-carboxylic acid,
7-(5-n-pentyl-3-thienyl)-xanthone-2-carboxylic acid, and
7-(3-thienyl)-xanthone-2-carboxylic acid.

EXAMPLE 5

A mixture of 1.8 grams of methyl 7-(1-formyl-3-oxo-1-n-butyl)-xanthone-2-carboxylate, 250 mg. of sodium borohydride and 50 ml. of tetrahydrofuran is stirred for 2.5 hours at room temperature. The reaction is monitored by tlc. After this period of time, a 5 percent aqueous acetic acid solution is added to the reaction mixture dropwise to neutrality and the resultant solution evaporated under vacuum and crystallized by the addition of ethanol and hot water. The precipitate is filtered off, washed and dried to give methyl 7-(1-hydroxy-methyl-3-hydroxy-1-n-butyl)-xanthone-2-carboxylate.

1.35 Grams of methyl 7-(1-hydroxymethyl-3-hydroxy-1-n-butyl)-xanthone-2-carboxylate are heated in 25 ml. of dimethylsulfoxide at 160°C for 16 hours. After dilution with water, the product is extracted with ether and chromatographed on silica to give methyl 7-(5-methyl-3-tetrahydrofuryl)-xanthone-2-carboxylate.

The thus prepared compound when hydrolyzed according to the procedure of the second paragraph of Example 3 affords 7-(5-methyl-3-tetrahydrofuryl)-xanthone-2-carboxylic acid.

In like manner, the following acid products are prepared, through their respective methyl esters by using the procedures of this Example on the products of Column B of Example 2.

7-(5-ethyl-3-tetrahydrofuryl)-xanthone-2-carboxylic acid,
7-(5-n-propyl-3-tetrahydrofuryl)-xanthone-2-carboxylic acid,
7-(5-isopropyl-3-tetrahydrofuryl)-xanthone-2-carboxylic acid,
7-(5-n-butyl-3-tetrahydrofuryl)-xanthone-2-carboxylic acid,
7-(5-isobutyl-3-tetrahydrofuryl)-xanthone-2-carboxylic acid,
7-(5-sec-butyl-3-tetrahydrofuryl)-xanthone-2-carboxylic acid,
7-(5-t-butyl-3-tetrahydrofuryl)-xanthone-2-carboxylic acid,
7-(5-n-pentyl-3-tetrahydrofuryl)-xanthone-2-carboxylic acid, and
7-(3-tetrahydrofuryl)-xanthone-2-carboxylic acid.

EXAMPLE 6

Two milliliters of methane sulfonyl chloride are added at 0°C to a solution of 2.9 g. of methyl 7-(1-hydroxy-methyl-3-hydroxy-1-n-butyl)-xanthone-2-carboxylate in 40 ml. of pyridine. After standing at room temperature for 18 hours, the mixture is poured into dilute HCl and extracted with chloroform to give methyl 7-(1-methylsulfonyloxymethyl-3-methylsulfonyloxy-1-n-butyl)-xanthone-2-carboxylate.

2.5 Grams of sodium hydrosulfide are added to a solution of 3.22 g. of methyl 7-(1-methylsulfonyloxymethyl-3-methylsulfonyloxy-1-n-butyl)-xanthone-2-carboxylate in 45 ml. of dimethylformamide and the mixture is stirred for 2 hours at room temperature. Dilution with water followed by extraction with ether and filtration through alumina gives methyl 7-(5-methyl-3-tetrahydrothienyl)-xanthone-2-carboxylate.

The thus prepared compound when hydrolyzed according to the procedure of the second paragraph of Example 3 affords 7-(5-methyl-3-tetrahydrothienyl)-xanthone-2-carboxylic acid.

In like manner, the following acid products are prepared, through their respective methyl esters by using the procedures of this Example on the products of Column B of Example 2.

7-(5-ethyl-3-tetrahydrothienyl)-xanthone-2-carboxylic acid,
7-(5-n-propyl-3-tetrahydrothienyl)-xanthone-2-carboxylic acid,
7-(5-isopropyl-3-tetrahydrothienyl)-xanthone-2-carboxylic acid,
7-(5-n-butyl-3-tetrahydrothienyl)-xanthone-2-carboxylic acid,
7-(5-isobutyl-3-tetrahydrothienyl)-xanthone-2-carboxylic acid,
7-(5-sec-butyl-3-tetrahydrothienyl)-xanthone-2-carboxylic acid,
7-(5-t-butyl-3-tetrahydrothienyl)-xanthone-2-carboxylic acid,
7-(5-n-pentyl-3-tetrahydrothienyl)-xanthone-2-carboxylic acid, and
7-(3-tetrahydrothienyl)-xanthone-2-carboxylic acid.

EXAMPLE 7

To a mixture of 2.0 grams of methyl 7-(3-tetrahydrothienyl)-xanthone-2-carboxylate in 50 ml. of methylene chloride maintained at 0°C, is added dropwise a solution of 1.02 g. of m-chloroperbenzoic acid in 30 ml. of chloroform. The resultant solution is filtered through alumina (CH$_2$Cl$_2$) and crystallized from chloroform:ethanol to give methyl 7-(1-oxo-3-tetrahydrothienyl)-xanthone-2-carboxylate.

The thus prepared compound when hydrolyzed according to the procedure of the second paragraph of Example 3, affords 7-(1-oxo-3-tetrahydrothienyl)-xanthone-2-carboxylic acid.

The above procedures are repeated upon the methyl esters of the products of Example 6 to give the following compounds:

7-(1-oxo-5-methyl-3-tetrahydrothienyl)-xanthone-2-carboxylic acid,
7-(1-oxo-5-ethyl-3-tetrahydrothienyl)-xanthone-2-carboxylic acid,
7-(1-oxo-5-n-propyl-3-tetrahydrothienyl)-xanthone-2-carboxylic acid,
7-(1-oxo-5-isopropyl-3-tetrahydrothienyl)-xanthone-2-carboxylic acid,
7-(1-oxo-5-n-butyl-3-tetrahydrothienyl)-xanthone-2-carboxylic acid,
7-(1-oxo-5-isobutyl-3-tetrahydrothienyl)-xanthone-2-carboxylic acid,
7-(1-oxo-5-sec-butyl-3-tetrahydrothienyl)-xanthone-2-carboxylic acid,
7-(1-oxo-5-t-butyl-3-tetrahydrothienyl)-xanthone-2-carboxylic acid, and
7-(1-oxo-5-n-pentyl-3-tetrahydrothienyl)-xanthone-2-carboxylic acid.

EXAMPLE 8

To a solution of 1.7 grams of methyl 7-(3-tetrahydrothienyl)-xanthone-2-carboxylate in 100 ml. of acetic acid are added 10 ml of 30 percent hydrogen peroxide and the resultant mixture is heated on the steam bath (80° to 90°C) for 30 minutes. The reaction mixture is diluted with water and cooled to give methyl 7-(1,1-dioxo-3-tetrahydrothienyl)-xanthone-2-carboxylate.

The thus prepared compound when hydrolyzed according to the procedure of the second paragraph of Example 3 affords 7-(1,1-dioxo-3-tetrahydrothienyl)-xanthone-2-carboxylic acid.

The above procedures are repeated upon the methyl esters of the products listed in Paragraph 4 of Example 6 to give the following compounds:

7-(1,1-dioxo-5-methyl-3-tetrahydrothienyl)-xanthone-2-carboxylic acid,
7-(1,1-dioxo-5-ethyl-3-tetrahydrothienyl)-xanthone-2-carboxylic acid,
7-(1,1-dioxo-5-n-propyl-3-tetrahydrothienyl)-xanthone-2-carboxylic acid,
7-(1,1-dioxo-5-isopropyl-3-tetrahydrothienyl)-xanthone-2-carboxylic acid,
7-(1,1-dioxo-5-n-butyl-3-tetrahydrothienyl)-xanthone-2-carboxylic acid,
7-(1,1-dioxo-5-isobutyl-3-tetrahydrothienyl)-xanthone-2-carboxylic acid,
7-(1,1-dioxo-5-sec-butyl-3-tetrahydrothienyl)-xanthone-2-carboxylic acid,
7-(1,1-dioxo-5-t-butyl-3-tetrahydrothienyl)-xanthone-2-carboxylic acid, and
7-(1,1-dioxo-5-n-pentyl-3-tetrahydrothienyl)-xanthone-2-carboxylic acid.

| Column C | Column D |
| --- | --- |
| 3-oxo-1-n-pentene | methyl 7-(1-formyl-4-oxo-n-hexyl)-xanthone-2-carboxylate |
| 3-oxo-1-n-hexene | methyl 7-(1-formyl-4-oxo-n-heptyl)-xanthone-2-carboxylate |
| 3-oxo-4-methyl-1-n-pentene | methyl 7-(1-formyl-4-oxo-5-methyl-n-hexyl)-xanthone-2-carboxylate |
| 3-oxo-1-n-heptene | methyl 7-(1-formyl-4-oxo-n-octyl)-xanthone-2-carboxylate |
| 3-oxo-5-methyl-1-n-hexene | methyl 7-(1-formyl-4-oxo-6-methyl-n-heptyl)-xanthone-2-carboxylate |
| 3-oxo-4-methyl-1-n-hexene | methyl 7-(1-formyl-4-oxo-5-methyl-n-heptyl)-xanthone-2-carboxylate |
| 3-oxo-4,4-dimethyl-n-n-pentene | methyl 7-(1-formyl-4-oxo-5,5-dimethyl-n-hexyl)-xanthone-2-carboxylate |
| 3-oxo-1-n-octene | methyl 7-(1-formyl-4-oxo-n-nonyl)-xanthone-2-carboxylate |
| 3-oxo-1-n-propene | methyl 7-(1-formyl-4-oxo-n-butyl)-xanthone-2-carboxylate |

In like manner, the corresponding lower alkyl carboxylates are prepared by employing the corresponding ester starting compound, said ester being prepared as described in Paragraph 1 of this Example.

EXAMPLE 10

A mixture of 3.6 grams of methyl 7-(1-formyl-4-oxo-n-pentyl)-xanthone-2-carboxylate, 400 mg. of sodium borohydride and 110 ml. of tetrahydrofuran is stirred for 2.5 hours at room temperature. The reaction is monitored by tlc. After this period of time, a 5 percent aqueous acetic acid solution is added to the reaction mixture dropwise to neutrality and the resultant solution evaporated under vacuum and crystallized by the addition of ethanol and hot water. The precipitate is filtered off, washed and dried to give methyl 7-(1-hydroxymethyl-4-hydroxy-n-pentyl)-xanthone-2-carboxylate.

A solution of 1.85 g. of methyl 7-(1-hydroxymethyl-4-hydroxy-n-pentyl)-xanthone-2-carboxylate in 35 ml. of dimethylsulfoxide is heated at 100° C for 18 hours. After diluting with water, the mixture is extracted with ether to give methyl 7-(6-methyl-3-tetrahydropyranyl)-xanthone-2-carboxylate.

The thus prepared compound when hydrolyzed according to the procedure of the second paragraph of Example 3 affords 7-(6-methyl-3-tetrahydropyranyl)-xanthone-2-carboxylic acid.

In like manner, the following acid products are prepared, through their respective methyl esters by using the procedures of this Example on the products of Column D of Example 9.

7-(6-ethyl-3-tetrahydropyranyl)-xanthone-2-carboxylic acid, 7-(6-n-propyl-3-tetrahydropyranyl)-xanthone-2-carboxylic acid, 7-(6-isopropyl-3-tetrahydropyranyl)-xanthone-2-carboxylic acid, 7-(6-n-butyl-3-tetrahydropyranyl)-xanthone-2-carboxylic acid, 7-(6-isobutyl-3-tetrahydropyranyl)-xanthone-2-carboxylic acid,

EXAMPLE 9

To a solution of 2.4 grams of methyl 7-(2-oxoethyl)-xanthone-2-carboxylate and 0.8 g. of 3-oxo-1-n-butene in 50 ml. of dry methanol, 70 mg. of sodium methoxide is added at 0°C. After stirring at this temperature for 2.5 hours, the mixture is acidified to give methyl 7-(1-formyl-4-oxo-n-pentyl)-xanthone-2-carboxylate.

In like manner, by employing the reagents listed in Column C below in the above procedure, the respective products listed in Column D are prepared.

7-(6-sec-butyl-3-tetrahydropyranyl)-xanthone-2-carboxylic acid, 7-(6-t-butyl-3-tetrahydropyranyl)-xanthone-2-carboxylic acid, 7-(6-n-pentyl-3-tetrahydropyranyl)-xanthone-2-carboxylic acid, and 7-(3-tetrahydropyranyl)-xanthone-2-carboxylic acid.

EXAMPLE 11

To a solution of 2.6 grams of methyl 7-(1-hydroxymethyl-4-hydroxy-n-pentyl)-xanthone-2-carboxylate in 35 ml. of pyridine is added 2.0 ml. of mesyl chloride and the resulting mixture is left at room temperature for 16 hours. It is then poured into dilute HCl/ice and extracted with ethyl acetate to give methyl 7-(1-methylsulfonyloxymethyl-4-methylsulfonyloxy-n-pentyl)-xanthone-2-carboxylate.

1.5 Grams of sodium hydrogen sulfide are added to a solution of 2.88 g. of methyl 7-(1-methylsulfonyloxymethyl-4-methylsulfonyloxy-n-pentyl)-xanthone-2-carboxylate in 75 ml. of dimethylformamide. The resulting suspension is stirred for three hours at room temperature, poured into dilute HCl and extracted with CHCl$_3$. The extracts are filtered through alumina (CH$_2$Cl$_2$) to give methyl 7-(5-methyl-3-tetrahydrothiopyranyl)-xanthone-2-carboxylate.

The thus prepared compound when hydrolyzed according to the procedure of the second paragraph of Example 3 affords 7-(5-methyl-3-tetrahydrothiopyranyl)-xanthone-2-carboxylic acid.

In like manner, the following acid products are prepared, through their respective methyl esters by using the procedures of this Example on the products of Column D of Example 9.

7-(6-ethyl-3-tetrahydrothiopyranyl)-xanthone-2-carboxylic acid, 7-(6-n-propyl-3-tetrahydrothiopyranyl)-xanthone-2-carboxylic acid, 7-(6-isopropyl-3-tetrahydrothiopyranyl)-xanthone-2-carboxylic acid, 7-(6-n-butyl-3-tetrahydrothiopyranyl)-xanthone-2-carboxylic acid, 7-(6-isobutyl-3-tetrahydrothiopyranyl)-xanthone-2-carboxylic acid, 7-(6-sec-butyl-3-tetrahydrothiopyranyl)-xanthone-2-carboxylic acid, 7-(6-t-butyl-3-tetrahydrothiopyranyl)-xanthone-2-carboxylic acid, 7-(6-n-pentyl-3-tetrahydrothiopyranyl)-xanthone-2-carboxylic acid, and 7-(3-tetrahydrothiopyranyl)-xanthone-2-carboxylic acid.

EXAMPLE 12

7-(3-Tetrahydrothiopyranyl)-xanthone-2-carboxylic acid is treated according to the procedures of Paragraphs 1 and 2 of Example 7 to give 7-(1-oxo-3-tetrahydrothiopyranyl)-xanthone-2-carboxylic acid.

Likewise prepared are:

7-(6-methyl-1-oxo-3-tetrahydrothiopyranyl)-xanthone-2-carboxylic acid, 7-(6-ethyl-1-oxo-3-tetrahydrothiopyranyl)-xanthone-2-carboxylic acid, 7-(6-n-propyl-1-oxo-3-tetrahydrothiopyranyl)-xanthone-2-carboxylic acid, 7-(6-isopropyl-1-oxo-3-tetrahydrothiopyranyl)-xanthone-2-carboxylic acid, 7-(6-n-butyl-1-oxo-3-tetrahydrothiopyranyl)-xanthone-2-carboxylic acid, 7-(6-isobutyl-1-oxo-3-tetrahydrothiopyranyl)-xanthone-2-carboxylic acid, 7-(6-sec-butyl-1-oxo-3-tetrahydrothiopyranyl)-xanthone-2-carboxylic acid, 7-(6-t-butyl-1-oxo-3-tetrahydrothiopyranyl)-xanthone-2-carboxylic acid, and 7-(6-n-pentyl-1-oxo-3-tetrahydrothiopyranyl)-xanthone-2-carboxylic acid.

EXAMPLE 13

7-(3-Tetrahydrothiopyranyl)-xanthone-2-carboxylic acid is treated according to the procedures of Paragraphs 1 and 2 of Example 8 to give 7-(1,1-dioxo-3-tetrahydrothio-pyranyl)-xanthone-2-carboxylic acid.

Likewise prepared are:

7-(6-methyl-1,1-dioxo-3-tetrahydrothiopyranyl)-xanthone-2-carboxylic acid, 7-(6-ethyl-1,1-dioxo-3-tetrahydrothiopyranyl)-xanthone-2-carboxylic acid, 7-(6-n-propyl-1,1-dioxo-3-tetrahydrothiopyranyl)-xanthone-2-carboxylic acid, 7-(6-isopropyl-1,1-dioxo-3-tetrahydrothiopyranyl)-xanthone-2-carboxylic acid, 7-(6-n-butyl-1,1-dioxo-3-tetrahydrothiopyranyl)-xanthone-2-carboxylic acid, 7-(6-isobutyl-1,1-dioxo-3-tetrahydrothiopyranyl)-xanthone-2-carboxylic acid, 7-(6-sec-butyl-1,1-dioxo-3-tetrahydrothiopyranyl)-xanthone-2-carboxylic acid, 7-(6-t-butyl-1,1-dioxo-3-tetrahydrothiopyranyl)-xanthone-2-carboxylic acid, and 7-(6-n-pentyl-1,1-dioxo-3-tetrahydrothiopyranyl)-xanthone-2-carboxylic acid.

EXAMPLE 14

A mixture of 4.5 grams of 7-(3-tetrahydrofuryl)-xanthone-2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl 7-(3-tetrahydrofuryl)-xanthone-2-carboxylate.

The foregoing procedure is repeated using the alternate lower alkyl iodides so as to prepare the corresponding lower alkyl acid esters hereof, e.g.:

ethyl 7-(3-tetrahydrofuryl)-xanthone-2-carboxylate,
n-propyl 7-(3-tetrahydrofuryl)-xanthone-2-carboxylate,
isopropyl 7-(3-tetrahydrofuryl)-xanthone-2-carboxylate,
n-propyl 7-(3-tetrahydrofuryl)-xanthone-2-carboxylate,
isobutyl 7-(3-tetrahydrofuryl)-xanthone-2-carboxylate,
sec-butyl 7-(3-tetrahydrofuryl)-xanthone-2-carboxylate,
n-pentyl 7-(3-tetrahydrofuryl)-xanthone-2-carboxylate, and so forth.

In like manner, the other xanthone-2-carboxylic acids thereof containing substituents at the C-7 position, prepared as described above, can be converted to the corresponding acid esters, e.g. methyl 7-(3-tetrahydrothienyl)-xanthone-2-carboxylate, ethyl 7-(3-tetrahydrothienyl)-xanthone-2-carboxylate.

EXAMPLE 15

To a solution of 10 grams of 7-(3-furyl)-xanthone-2-carboxylic acid in 200 ml. of ethanol is added the theoretical amount of sodium hydroxide dissolved in 200 ml. of 90 percent ethanol. The reaction mixture is then concentrated in vacuum to give sodium 7-(3-furyl)-xanthone-2-carboxylate.

Sodium 7-(3-tetrahydrofuryl)-xanthone-2-carboxylic and sodium 7-(3-tetrahydrothienyl)-xanthone-2-carboxylate are also thus prepared.

In a similar manner, the potassium and lithium salts are prepared. Similarly, by replacing the sodium salt by means of an appropriate metal salt reagent, e.g. calcium chloride, manganese chloride, and so forth, the other xanthone-2-carboxylic acid salts are prepared, e.g.:

magnesium 7-(3-furyl)-xanthone-2-carboxylate,
calcium 7-(3-furyl)-xanthone-2-carboxylate,
aluminum 7-(3-furyl)-xanthone-2-carboxylate,
ferrous 7-(3-furyl)-xanthone-2-carboxylate,
zinc 7-(3-furyl)-xanthone-2-carboxylate,
manganese 7-(3-furyl)-xanthone-2-carboxylate,
ferric 7-(3-furyl)-xanthone-2-carboxylate, and so forth.

In a similar manner, the xanthone-2-carboxylic acid salts of the other C-7 substituted xanthone-2-carboxylic acids hereof are prepared.

EXAMPLE 16

To a mixture of 50 milliliters of concentrated aqueous ammonia in 500 ml. of methanol there are added 20 g. of 7-(3-tetrahydrofuryl)-xanthone-2-carboxylic acid. The resultant mixture is stirred for two hours and is then evaporated to dryness to give the ammonium salt of 7-(3-tetra-hydrofuryl)-xanthone-2-carboxylic acid.

A solution of 10 g. of 7-(3-thienyl)-xanthone-2-carboxylic acid in 50 ml. of thionyl chloride is heated at reflux for one hour. Thereafter, the solution is evaporated to dryness to give the corresponding acid chloride to which is added a concentrated ethereal ammonia solution. The resultant solution is evaporated giving the ammonium salt of 7-(3-thienyl)-xanthone-2-carboxylic acid.

In like manner, the lower alkyl amides can be prepared using monoalkylamine or dialkylamine in lieu of ammonia in the above procedures. Thus prepared, e.g. are:

7-(3-tetrahydropyranyl)-xanthone-2-carboxylic acid amide,
N-methyl 7-(1-oxo-3-tetrahydrothiopyranyl)-xanthone-2-carboxylic acid amide,
N,N-dimethyl 7-(1,1-dioxo-3-tetrahydrothienyl)-xanthone-2-carboxylic acid amide,
N,N-diethyl 7-(3-tetrahydrofuryl)-xanthone-2-carboxylic acid amide,
N-ethyl 7-(3-tetrahydrothienyl)-xanthone-2-carboxylic acid amide,
N-n-propyl 7-(3-furyl)-xanthone-2-carboxylic acid amide, and so forth.

EXAMPLE 17

To a mixture of 20 grams of procaine and 500 ml. of aqueous methanol are added 20 g. of 7-(3-furyl)-xanthone-2-carboxylic acid. The resultant mixture is stirred at room temperature for 16 hours. It is then evaporated under reduced pressure, to give the procaine salt of 7-(3-furyl)-xanthone-2-carboxylic acid.

Similarly, the lysine, caffeine, and arginine salts thereof are obtained. In like manner, the e.g. procaine, lysine, caffeine, and arginine salts of the other 7-substituted xanthone-2-carboxylic acids are obtained, e.g.:

the procaine salt of 7-(5-methyl-3-tetrahydrofuryl)-xanthone-2-carboxylic acid, the caffeine salt of 7-(6-ethyl-3-tetrahydropyranyl)-xanthone-2-carboxylic acid, the lysine salt of 7-(5-methyl-3-furyl)-xanthone-2-carboxylic acid, the procaine salt of 7-(5-propyl-3-tetrahydrothienyl)-methylxanthone-2-carboxylic acid, and the arginine salt of 7-(3-thienyl)-xanthone-2-carboxylic acid.

EXAMPLE 18

The following illustrate the method by which the pharmaceutical compositions of the compounds hereof are prepared.

Sodium chloride (0.44 g.) is dissolved in 80 ml. of a (9.47 g/l. water) sodium hydrogen phosphate solution. A sodium dihydrogen phosphate (8.00 g/l. water) solution (20 ml.) is then added thereto. The resultant solution having a pH of 7.38 is sterilized in an autoclave. This vehicle is then added to solid, dry sodium 7-(3-furyl)-xanthone-2-carboxylate to give a preparation suitable for intravenous injection containing 2.5 mg. of sodium 7-(3-furyl)-xanthone-2-carboxylate per milliliter of total composition.

7-(3-Tetrahydrothienyl)-xanthone-2-carboxylic acid is dissolved in a vehicle having a composition ranging from propylene glycol:water of 10:90 (w/w) to propylene glycol: water of 50:50 (w/w) to give an aerosol preparation suitable for inhalation.

Sodium 7-(3-thienyl)-xanthone-2-carboxylic acid (1 part) is mixed with from 1 to 10 parts (by weight) of lactose or urea to give a powder preparation suitable for administration by nebulization.

Tablet preparations suitable for oral administration are prepared by mixing the following ingredients in the indicated proportions:

| Component | Percent, by Weight |
| --- | --- |
| a xanthone-2-carboxylic acid compound hereof | 0.5–70 |
| polyvinylpyrrolidone | 0.5–10 |
| starch | 10 –25 |
| lactose | 20 –75 |
| magnesium stearate | 0.1– 1 |
| granulating fluids (e.g. aqueous methanol, water, chloroform) | |

EXAMPLE 19

Illustrative test procedures for the compounds hereof are as follows:

Normal female (Sprague-Dawley) rats of 140 to 160 grams each are passively sensitized intradermally by injection of rat anti-egg albumin reaginic sera. After 24 hours, each rat is challenged intravenously with 1.75 ml. of 0.4 percent Evans blue, 1 mg. egg albumin plus 0.125 mg. of 7-(3-tetrahydrofuryl)-xanthone-2-carboxylic acid. Control rats receive no xanthone-2-carboxylic acid. The dermal bluing is recorded 15 to 25 minutes later. The rats which receive the 7-(3-tetrahydrofuryl)-xanthone-2-carboxylic acid exhibit a 100 percent inhibition of allergic reaction whereas the control rats exhibit no inhibition.

The above procedure is repeated using 7-(3-tetrahydrothienyl)-xanthone-2-carboxylic acid, with similar results. The above procedure is repeated using oral administration, with similar results.

EXAMPLE 20

A dosage of 100 mg. per kg. of body weight of 7-(3-tetrahydrothienyl)-xanthone-2-carboxylic acid is given intraperitoneally to guinea pigs. Other pigs are left untreated to serve as controls. After treatment, the treated pigs and the controls are exposed to an aqueous spray of 0.05 percent histamine diphosphate (calc. as base), delivered by a nebulizer, until they exhibit a loss of righting ability. During exposure they are observed for severity of reaction. This ranges from slightly deeper breathing to deep breathing to preconvulsive gasping and ataxia to collapse. The pigs which receive the 7-(3-tetrahydrothienyl)-xanthone-2-carboxylic acid exhibit a significant resistance to the histamine aerosol challenge, whereas all control pigs collpase within the exposure time.

The above procedure is repeated using 7-(3-tetrahydrofuryl)-xanthone-2-carboxylic acid with similar results.

The trachea of a recently sacrificed guinea pig is removed by disection and cut between the segments of cartilege into rings containing tracheal muscle which are tied to form a 180° alternating smooth muscle tracheal chain. The thus produced continuous length of smooth muscle is mounted in a tissue bath maintained at 37°C with the upper end attached to a linear motion transducer which in turn is connected to a recorder. The responses of a standard, amino-phylline, and 7-(3-tetrahydrofuryl)-xanthone-2-carboxylic acid are compared after introducing each separately into the bath in various amounts or concentrations. The results show a significant relaxation of the tracheal chain with the test compound.

Inhibition of reaginic antigen-antibody reactions in rats is regarded as representative of inhibition of human reaginic antigen-antibody reactions which occur during allergic episodes. Protection against histamine aerosol induced bronchoconstriction and relaxation of isolated tracheal chain is regarded as representative of human broncho-pulmonary activity including bronchodilator activity. Subjects suffering from bronchopulmonary disorders are studied as to severity of bronchospasm and changes in severity by observable and measurable changes in expiratory function. Such measurements include quantitation of expiratory pulmonary air flow, measurable by such instruments as a peak flow meter, and comparison of pulmonary volumes before and after treatment with the subject compounds hereof, as measured by spirometric and/or plethysmographic methods. Subjective relief of the symptoms upon administration of the compounds hereof is evidenced by improvements in dyspnea, wheezing, cough and expectorated sputum.

What is claimed is:

1. A compound selected from those represented by the following formulas:

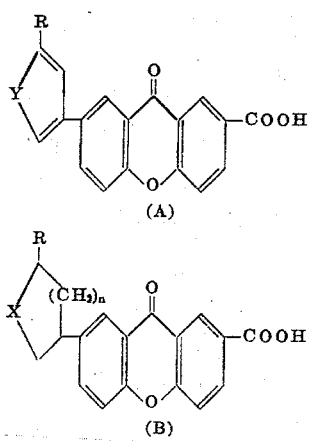

and the pharmaceutically acceptable, non-toxic lower alkyl or glycerol esters, unsubstituted, mono-lower alkyl, di-lower alkyl, or phenethyl substituted amides and salts thereof,
   wherein each R is hydrogen or lower alkyl, X is oxy, thio, sulfinyl, or sulfonyl; n is 1 or 2; and Y is oxy or thio.

2. A compound according to claim 1 of Formula (A).

3. A compound according to claim 2 wherein R is methyl.

4. A compound according to claim 2 wherein R is hydrogen.

5. A compound according to claim 4 wherein Y is oxy.

6. A compound according to claim 4 wherein Y is thio.

7. A compound according to claim 1 of Formula (B).

8. A compound according to claim 7 wherein R is methyl.

9. A compound according to claim 7 wherein R is hydrogen.

10. A compound according to claim 9 wherein n is 2.

11. A compound according to claim 9 wherein n is 1.

12. A compound according to claim 11 wherein X is oxy.

13. A compound according to claim 11 wherein X is thio.

14. A compound according to claim 1 which is 7-(3-tetrahydrofuryl)-xanthone-2-carboxylic acid.

15. The compound according to claim 1 which is 7-(3-tetrahydrothienyl)-xanthone-2-carboxylic acid.

16. The sodium salt of the compounds according to claim 1.

17. The salt according to claim 16 of Formula (B).

* * * * *